(12) United States Patent
Miyajima

(10) Patent No.: US 6,188,468 B1
(45) Date of Patent: Feb. 13, 2001

(54) IMAGE READING-OUT APPARATUS PROVIDED WITH AUTOMATIC DOCUMENT CONVEYING APPARATUS

(75) Inventor: Masami Miyajima, Yokohama (JP)

(73) Assignee: Ricoh Company, Ltd., Tokyo (JP)

( * ) Notice: Under 35 U.S.C. 154(b), the term of this patent shall be extended for 0 days.

(21) Appl. No.: 09/302,263

(22) Filed: Apr. 30, 1999

(30) Foreign Application Priority Data

Apr. 30, 1998 (JP) .................................................. 10-120371
Apr. 19, 1999 (JP) .................................................. 11-110311

(51) Int. Cl.[7] .......................... G03B 27/00; G06F 15/00; H04N 1/21; H04N 1/40; G03G 15/00
(52) U.S. Cl. .......................... 355/407; 355/233; 355/202; 355/316; 358/280; 358/296; 358/302; 358/316; 358/403; 358/449; 345/418; 399/377
(58) Field of Search .............................. 345/418; 355/233, 355/202; 358/296, 302, 316, 449, 403, 280; 399/377

(56) References Cited

U.S. PATENT DOCUMENTS

| 4,656,524 | * | 4/1987 | Norris et al. | 358/280 |
|---|---|---|---|---|
| 5,327,261 | * | 7/1994 | Hirota et al. | 358/449 |
| 5,339,134 | * | 8/1994 | Nakamura et al. | 355/202 |
| 5,414,522 | * | 5/1995 | Moriya | 358/296 |
| 5,546,168 | * | 8/1996 | Adachi et al. | 355/233 |
| 5,699,165 | * | 12/1997 | Suzuki et al. | 358/296 |
| 5,710,967 | * | 1/1998 | Motoyama | 399/377 |
| 5,920,381 | * | 7/1999 | Katsuta | 355/316 |
| 6,031,632 | * | 2/2000 | Yoshihara et al. | 358/403 |
| 6,043,819 | * | 3/2000 | Leburn et al. | 345/418 |
| 6,057,937 | * | 5/2000 | Shimizu et al. | 358/302 |

* cited by examiner

Primary Examiner—David Groy
Assistant Examiner—Raghuveer Bindingnavele
(74) Attorney, Agent, or Firm—Oblon, Spivak, McClelland, Maier & Neustadt, P.C.

(57) ABSTRACT

An automatic manuscript document conveying apparatus which can freely set printing of a mark on a document, e.g. indicating completion of a reading or transmitting operation of the document, such that the mark is printed on the document based on a distance from a reading position in a first mode, and such that the mark is printed on the document based on a distance from a rear end of the document in a second mode. As a result, the apparatus can surely print the character on the document even in case that the document is short and the first mode is set, and even in a case that double or plural documents are conveyed and the second mode is set. When the second mode is set for the printing position, in a case that the read document is not shorter than the reading area, the mode is automatically changed over to the first mode. On the other hand, when the first mode is set, in a case that the read document is not longer than the reading area, the mode is automatically changed over to the second mode.

29 Claims, 7 Drawing Sheets

| | 7 | 6 | 5 | 4 | 3 | 2 | 1 | 0 |
|---|---|---|---|---|---|---|---|---|
| 0 | RESERVED | | PAGE CODE ( 27H ) | | | | | |
| 1 | PARAMETER LENGTH ( 06H ) | | | | | | | |
| 2 | ENDORSER CONTROL | | | | | | | |
| 3 ≀ 7 | DON'T CARE ( IGNORED ) | | | | | | | |

RESERVED   ENDORSED CONTROL

| CODE | DESCRIPTION |
|---|---|
| 0H | ENDORSER: NOT USED |
| 1H | ENDORSER: USED ( DOCUMENT STANDARD ) |
| 2H | ENDORSER: USED ( READING-OUT AREA STANDARD ) |
| 3H | RESERVED |

IMAGE READING-OUT APPARATUS PROVIDED WITH AUTOMATIC DOCUMENT CONVEYING APPARATUS

BACKGROUND OF THE INVENTION

1. Field of the Invention

The present invention relates to an image reading apparatus, and in particular to an image reading apparatus provided with an automatic document conveying apparatus, in which a sheet of a document is separated sheet by sheet from a document of plural sheets and the separated document is conveyed to a reading position, and thereafter an indication of completing the reading operation is printed on the read document.

2. Discussion of the Background Art

Generally, an automatic document feeder (which hereinafter is referred to as an "ADF") is installed in an image reading apparatus such as a copying machine, facsimile device, scanner device, etc. The ADF separates a sheet of a document sheet by sheet from a document having plural sheets, and conveys the separated document sheet to a reading position on a contact glass serving as a document reading stand, and thereafter discharges the document after it is read.

There also exists an image reading apparatus such as a facsimile device or a scanner device which, after finishing the transmission or reading operation, performs a marking at an optional position on the document with a completion stamp, indicating that the document has been read or transmitted.

The completion stamp marking device is installed on the conveying path of the ADF downstream from the reading position. In a case of utilizing the document as a standard position, the marking is performed at a position at a predetermined distance, for instance 10 mm, from the rear end portion of the document in the conveying direction thereof. On the other hand, in a case of setting a reading area, that is, an optional reading area on the document surface, as a standard position, the marking is performed at a position at a predetermined distance, for instance 10 mm, from the rear end portion of the reading area.

However, in such a background art ADF, the position of marking is fixed at either one of the document standard position or the reading area standard position. That is, in the background art the marking indicating completion of reading of the document is preset to be fixed at either a predetermined distance from a rear end of a reading area, or a predetermined distance from a rear end of a document. In the background art only one of these two systems is implemented. For this reason, there arises a problem to be solved that, in the case of adopting the document standard position as the marking position, when a double conveying of plural (two or more) documents improperly occurs, the marking is performed on the next doubly-conveyed document instead of the properly read document.

Furthermore, there arises another problem to be solved that, in the case of adopting the reading area standard position as the marking position, when the length of the manuscript document is shorter than that of the reading area, the marking cannot be performed on the read document. The occurrence of such problems is a defect of the background art.

SUMMARY OF THE INVENTION

The present invention has as one objective to solve the above-mentioned and other problems. It is therefore an object of the present invention to solve the problems in the background art.

It is still another object of the present invention to provide an automatic document conveying apparatus capable of solving the problem that, in the case of adopting a document standard position as a marking position, when a double conveying of plural (two or more) documents occurs, the marking is performed on a next double-conveyed document instead of the properly read document.

It is still another object of the present invention to provide an automatic document conveying apparatus capable of solving the problem that, in the case of adopting a reading area standard position as the marking position, when the length of the document is shorter than that of the reading area, the marking cannot be properly performed on the read document.

It still another object of the present invention to provide an automatic document conveying apparatus which is capable of freely setting a state of printing a marking indicating completion of reading, transmitting, etc. in either one of a first mode of a reading area standard or a second mode of a document standard, and which is capable of surely performing the printing of the marking on the document even in a case that a length of documents is short at the time of setting the first mode, and even in a case that double conveying of the document occurs at the time of setting the second mode.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
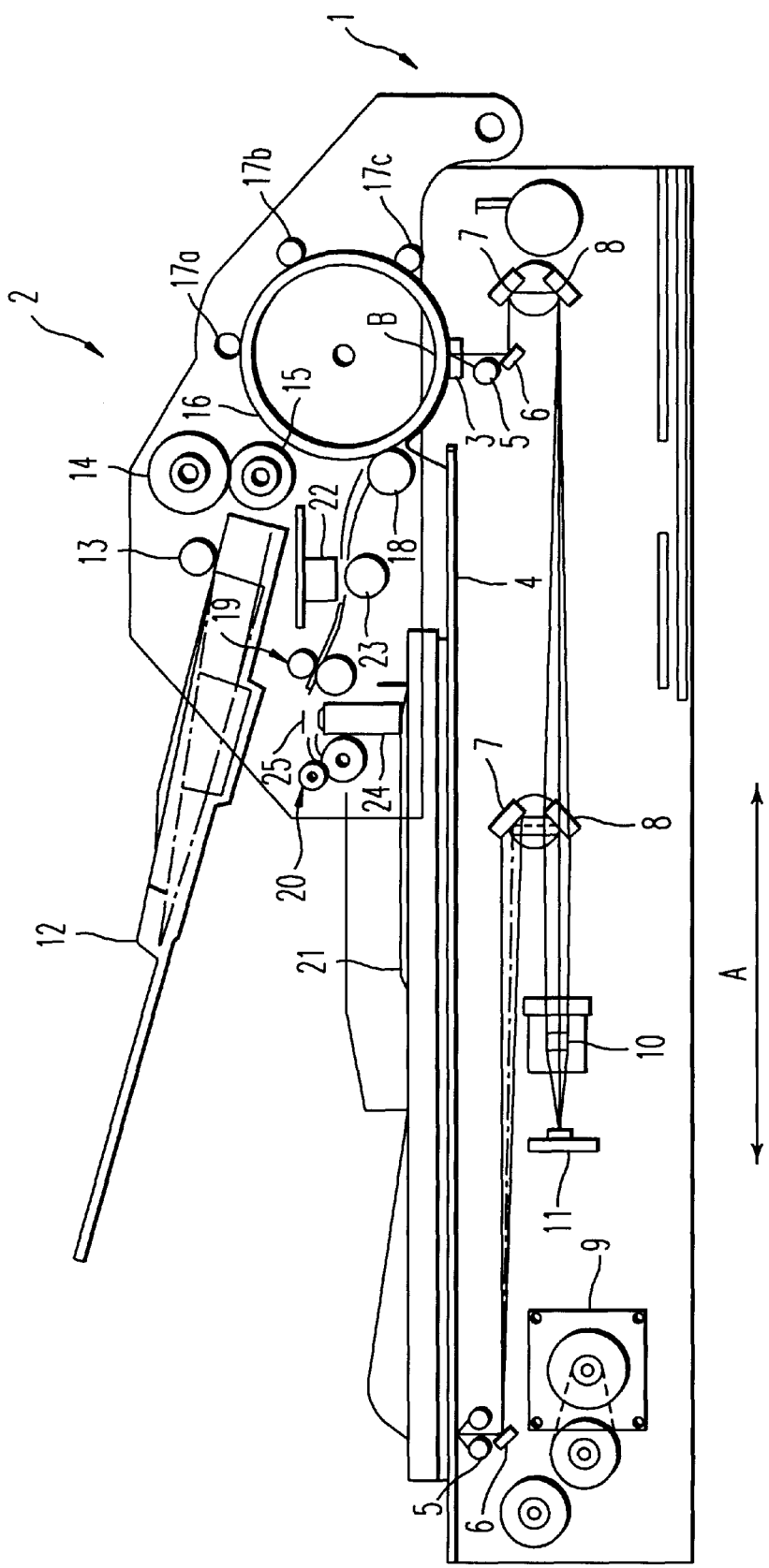
FIG. 1 is an overall side view illustrating an embodiment of an automatic document conveying apparatus of the present invention, that is, an outlined structural view of a scanner device provided with an ADF.

Referring now to the drawings, wherein like reference numerals designate identical or corresponding parts throughout the several views, the more particularly to FIG. 1 thereof, an automatic document conveying apparatus of the present invention is shown. The embodiment of the present invention is described hereinafter, in detail, referring to the accompanying drawings.

FIGS. 1 through 7 are explanatory diagrams for explaining an embodiment of an automatic document feeder conveying apparatus (which is hereinafter simply referred to as an "ADF") relating to the present invention. Furthermore, although the present embodiment shows only an example of applying the ADF to a scanner device, such an ADF can also be applied to other apparatuses which read documents, such as a facsimile device, a copying machine, etc., in addition to a scanner device.

In FIG. 1, the reference numeral 1 represents a scanner device, and an ADF 2 is carried on the upper part of the scanner device 1.

A slit glass 3, which is reading position, and a contact glass 4 are mounted on the upper surface of the scanner device 1. The slit glass 3 has a square measure corresponding to several lines of images on the document to be read, and the contact glass 4 has another square measure a little larger than that of a maximum-sized document to be read by the scanner 1.

An illuminating lamp 5 and a first mirror 6, which may be integrally formed with the illuminating lamp 5, are provided on the lower part of the slit glass 3 and the contact glass 4. Further, a second mirror 7 and a third mirror 8, which may be integrally formed with the second mirror 7, are also provided thereon. The illuminating lamp 5 and the first through third mirrors 6–8 are moved by a moving-body motor 9 in the direction of the arrow A.

To state concretely, at the time of reading the document mounted on the contact glass 4, the illumination lamp 5 and the first mirror 6 are moved in the direction of the arrow A on the lower part of the contact glass 4, and thereby light emitted from the illuminating lamp 5 is radiated onto the document surface through the contact glass 4. Then, reflection light reflected off the document is directed to a lens 10 by the second mirror 7 and the third mirror 8 both moved in the direction of the arrow A. Lens 10 focuses the reflected light, and the reflected light is then radiated onto a CCD (Charge Coupled Device) 11. The CCD 11 converts the radiated light to an electric signal.

Further, when the document is read at the reading position B of the slit glass 3, the illuminating lamp 5 and the first through third mirrors 6–8 are stopped on the lower part of the slit glass 3. And then, the reflection light is radiated onto the CCD 11 through the abovementioned radiation path.

Next, the structure of the ADF 2 is described. The ADF 2 includes a document tray 12 for accommodating therein documents of plural sheets. From the plural sheet document accommodated in the document tray 12, the document sheets are fed sheet-by-sheet by action of a pickup roller 13.

The document sheets thus fed are slidably brought into contact with a feed roller 14 rotating in the document conveying direction (counterclockwise direction), and the document sheet situated at an uppermost position is surely separated from other document sheets by action of the reverse roller 15 rotating in a document separating/blocking direction (counterclockwise direction). The uppermost document sheet thus separated is conveyed to the slit glass 3 by conveying rollers 17a–17c slidably brought into contact with a conveying drum 16. The surface of the document thus conveyed is read by the above-mentioned illuminating lamp 5, etc. Thereafter, the surface of the document thus read is discharged from the area on the slit glass 3 by a conveying roller 18 reliably in contact with the conveying drum 16.

Moreover, in the present embodiment, the pickup roller 13, the paper feed roller 14, and the reverse roller 15 construct a separation/conveyance medium.

The document discharged from the slit glass 3 is further discharged onto the paper discharging tray 21 by the actions of conveying roller pair 19 and paper discharging roller pair 20.

Furthermore, an image sensor 22 is provided downstream in the document conveying direction from the slit glass 3. The image sensor 22 is composed of elements such as an LED, lens, sensor element, etc. for constructing a light source (not shown). The light emitted from such an LED is radiated onto the document surface opposite to the document surface already read through the slit grass 3. The reflection light reflected off the document surface can be focused by a lens. Thereafter, the focused light can be further focused by a sensor element. The light thus focused is converted to an electric signal.

Furthermore, a white-colored roller 23 is provided opposing the image sensor 22 with the document to pass therebetween. The white-colored roller 23 is employed as a member for performing shading compensation at the time of reading the document by use of the image sensor 22.

Furthermore, an endorser unit (e.g., a character printing medium) 24 is provided downstream in the document conveying direction from the image sensor 22. The endorser unit 24 prints a mark on a document. The mark may represent completion of reading of the document discharged from the slit glass 3, completion of transmission, etc. An endorser platen 25 is provided opposing the endorser unit 24 with the manuscript document to pass therebetween.

As shown in Fig, 2, the endorser unit 24 is composed of a rubber stamp 26 including alphabet characters, figures, etc. and containing ink infiltrating thereinto, an ink roller 27 having the rubber stamp 26 wound therearound, and a hammer 28 for pressurizing the rubber stamp 26 in the direction of the endorser platen 25. The hammer is driven by a drive solenoid 43 (shown in FIG. 3).

The endorser unit 24 may be a rubber belt impact type printer which is small-sized and low-cost and is usually referred to as a "microprinter". The endorser unit 24 can be installed in the paper conveying path. In addition, the noise emitted from the endorser unit 24 at the time of printing should be very small.

Figure 2:
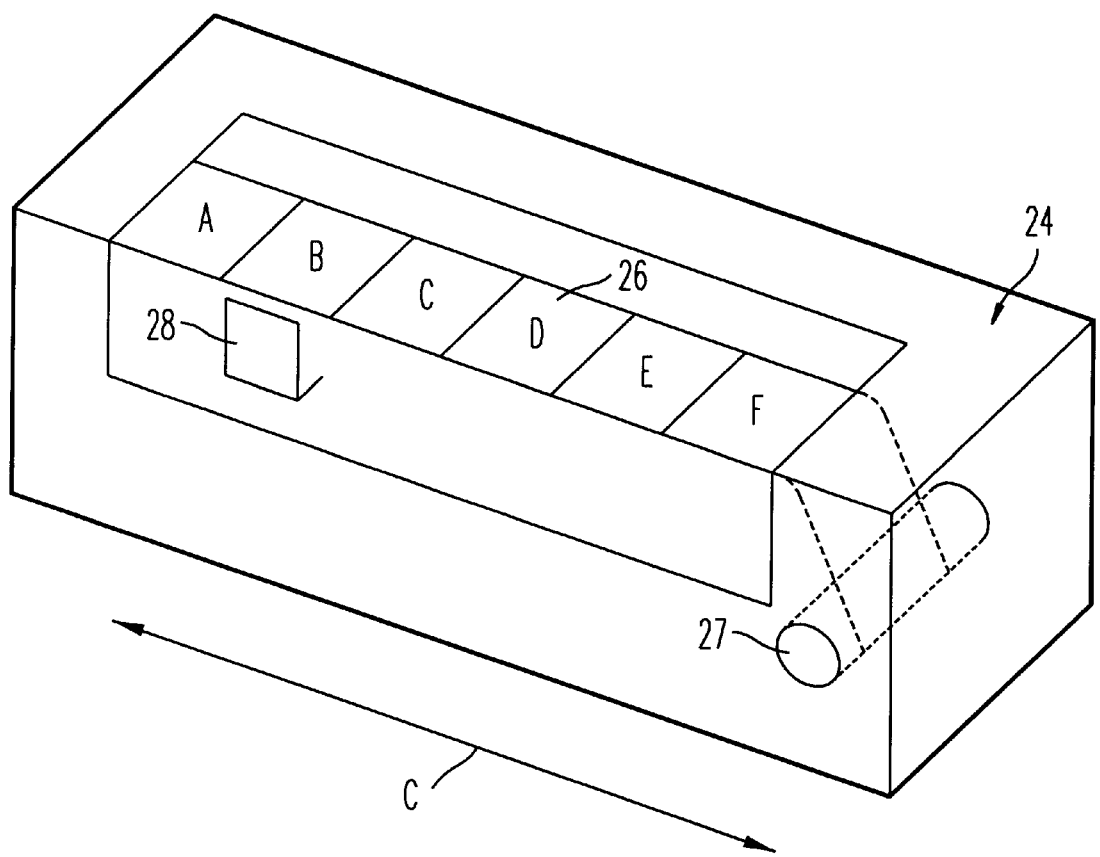
FIG. 2 is an outlined structural view showing an end-user unit of an embodiment of the present invention.

When the mark, e.g., indicating the completion of reading of the document, is printed on the document by the endorser unit 24, the document is stopped such that a predetermined position of the document (where the mark is to be printed) is located opposite the endorser unit 24, and the document is fixed by a pressurizing operation by the endorser platen 25. In FIG. 2, the rubber stamp 26 is driven by the ink roller 27 in the direction of the mark B, and the character, figure, etc. is selected at this time. When the desired character or figure is situated adjacent the hammer 28, the hammer 28 is driven by the drive solenoid, and thereby the rubber stamp 26 is pushed into the document. In this way, the mark is printed on the document. Furthermore, when a predetermined character row or figure row is desired to be printed, the ink roller 27 can be driven several times and a large number of characters and figures can thereby be printed on the document.

Figure 3:
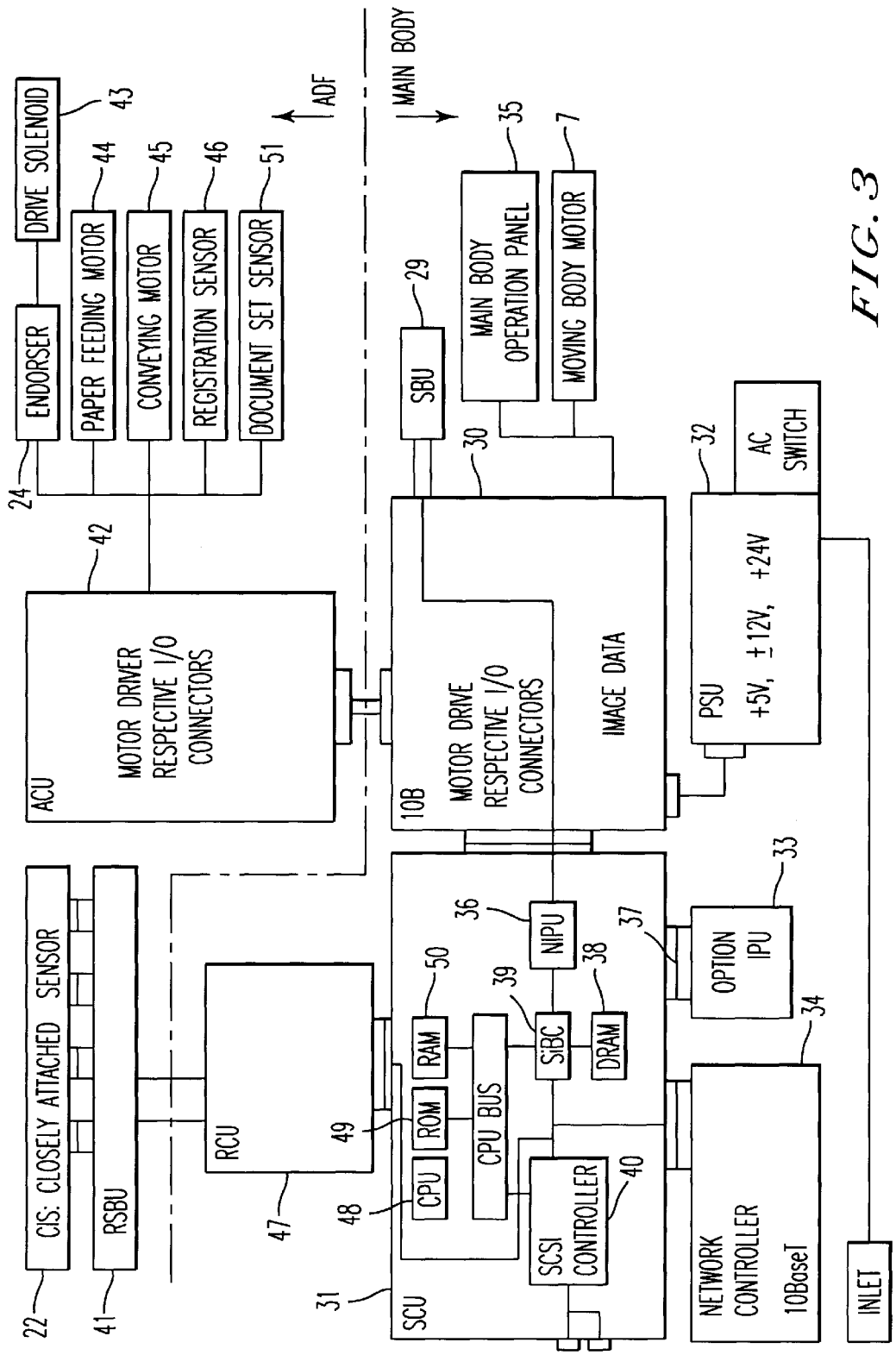
FIG. 3 is a block diagram explaining a scanner device of an embodiment of the present invention.

Next, the scanner device 1 is explained referring to the block diagram in FIG. 3.

In Fig, 3, the main body side of the scanner device 1 is provided with an SBU (Sensor Board Unit) 29, an IOB (Input/Output Board) 30, an SCU (Scanner Control Unit) 31, a PSU (Power Supply Unit) 32, an option IPU 33, a network controller 34, a main body operation panel 35, and a moving-body motor 7.

The SBU 29 is provided with the CCD 11. The reflection light reflected off the document input to the CCD 11 is converted to an electric analog signal having a voltage value corresponding to the intensity of the light on the CCD 11. The analog signal can be divided into odd bits and even bits, and the bits thus divided are output from the CCD 11.

Regarding the analog signal, the dark electric potential part is removed on the SBU 29 in the analog signal processing circuit (not shown) and the odd number bits and the even number bits are composed with each other. After adjusting the gain to achieve a predetermined amplitude value, the analog signal thus processed is input to an A/D (analog-to-digital) converter (not shown) and is converted into a digital signal.

The image signal thus digitalized is processed with appropriate compensations, e.g., shading compensation, γ compensation, and MTF (Modulation Transfer Function) compensation, etc. by the NIPU (New Image Processing Unit) 36 on the SCU 31. Thereafter, the compensated image signal is binarized and the binarized image signal is output as a video signal to the option IPU 33 through the connector 37 together with a page synchronization signal, line synchronization signal, and image clock.

A predetermined image processing of the video signal is performed in the option IPU 33. Thereafter, the image processed video signal is input once again to a selector (not shown) of the SCU 31 via the connector 37. The selector is constructed such that one-side input of the selector becomes the video signal output from the NIPU 36 and enables selecting whether or not the image processing is performed in the option IPU 33.

The video signal output from the selector is input to an SiBC (Scan image Buffer Controller) 39 administrating the DRAM (Dynamic Random Access Memory) 38 constructing the image data memorizing portion, and the video signal is stored in the image memory constructed with the DRAM 3 8. The image data stored in the image memory are transmitted to an SCSI (Small Computer System Interface) controller 40 and can be further transferred to an external device such as a personal computer, etc.

On the other hand, the main body side of the ADF 2 is composed of an RSBU (Reverse-Side Sensor Board Unit) 41, the image sensor 22, a motor driver 42, the endorser unit 24, the drive solenoid 43, a paper feeding motor 44, a conveying motor 45, a registration sensor 46, and a document set sensor 51.

The analog signal optoelectrically converted by the image sensor 22 is converted into a digital signal at the RSBU 41. Thereafter, the signal is processed with shading compensation at the RSBU 41. The shading-compensated signal is transmitted to the RCU (Reverse side Control Unit) 47 installed at the main body side of the scanner device 1.

The RCU 47 is constructed with the image memory constructed with the DRAM 38 and the SiBC 39 for controlling the image data memory. After once storing the image data in the image memory DRAM 38, the image data are further transmitted to the SCU 31.

The image data transmitted from the RCU 47 to the SCU 31 and the image data output from the SiBC 39 on the SCU 31 can be changed over from each other. Either one or both data is selected, and the selected data are transferred to the SCSI controller 40.

A CPU (Central Processing Unit) 48, a ROM (Read Only Memory) 49, and a RAM (Random Access Memory) 50 can be practically mounted on the SCU 31. The CPU 49 controls the SCSI controller 40 and thereby enables performing communication with an external device such as a personal computer.

An ACU (ADF Driving Unit) 42 has a function of relaying electric power supplying of the electric mounting parts used for the ADF 2. An input port connected to the CPU 48 on the SCU 31 is further connected to the operation panel 35 of the apparatus main body through the IOB 30. A start switch and an abort switch can be practically mounted on the operational panel 35 of the apparatus main body. When the respective switches are pushed down, the CPU 48 detects that those switches are turned on through the input port.

The paper feeding motor 44 drives the pickup roller 13, the paper feeding roller 14, and the reverse roller 15. The conveying motor 45 drives the conveying drum 16, the pair of conveying rollers 19, and the pair of paper discharging rollers 20. The movement timing of the moving-body motor 9, the paper feeding motor 45, and the conveying motor 46 are controlled by the CPU 48. The drive solenoid 43 drives the hammer 28, and the timing thereof is controlled by the CPU 48.

The registration sensor 46 is disposed on the conveying path between the slit glass 3 and the paper feeding roller 14. The front and rear edges of a document are detected by the registration sensor 46, and corresponding detection signals are output to the CPU 48, The CPU 48 discriminates (judges) the length of the manuscript document on the basis of the detected information. In the present embodiment, the detecting medium is constructed with the registration sensor 46 and the CPU 48.

The document set sensor 51 may be constructed with a plurality of sensors (not shown) arranged on the document mounting surface of the document tray 12. At the time of mounting the document on the document mounting surface thereof, when an optional sensor is turned on in accordance with the size of the document as is well known, the CPU 48 detects the size of the document on the basis of the combination of the ON signals. In the a present embodiment, the document set sensor 51 and the CPU 48 also construct a detection medium for detecting a size of a fed document.

On the other hand, the CPU 48 can also set the reading area of the manuscript document conveyed onto the slit glass 3. The reading area is set to an optional area for the document surface, namely, for the entire document surface or a part of the document surface. A setting medium therefore is constructed in the CPU 48. Such a setting operation is performed on the basis of a signal input from an external device, such as a personal computer, through the SCSI controller 40. Or otherwise, it is also allowable to set the reading area on the manuscript document surface by performing a switching operation on the operation panel of the main apparatus body.

Furthermore, in a case of printing the mark, e.g. indicating reading completion by the endorser unit 24, the mark can be printed at either 1) a position (for instance, 7 mm) from the rear end portion of the reading area for a reading area standard in a first mode, or 2) the mark can be printed at a position a predetermined distance (for instance, 7 mm) from the rear end portion of the document in the conveying direction thereof for a document standard in a second mode.

That is, the present invention allows a system which can alternate the position of printing the mark. In the present invention the mark can be printed based on one of two measurements depending on a current operation of the image forming apparatus. One printing operation is based on a distance from a rear end of a reading position, and is noted above as the first mode operation, and a second printing operation is based on a distance from a rear end of a document, and is noted above as the second mode operation.

The selection of the character printing position is performed by inputting a mode selecting command discussed further below, e.g. from an external device, e.g. personal computer, to the CPU 48 through the SCSI controller 40. The CPU 48 constructs a selection medium for selecting either one of the first mode of setting the character printing position utilizing the reading area as the standard by use of the endorser unit 24 on the basis of a command input from the personal computer, and the second mode of setting the same utilizing the document as the standard.

Furthermore, when a document having a length not shorter than the reading area is detected on the basis of the detecting information from the register sensor 46 at the time of setting the second mode, the CPU 48 automatically changes over the mode to the first mode. On the other hand, when the manuscript document having a length not longer than the reading area is detected on the basis of the detecting information from the register sensor 46 at the time of setting the first mode, the CPU 48 automatically changes over from the first mode to the second mode. The CPU 48 further constructs a control medium for performing the control operation as mentioned above.

In these ways, the present invention provides flexibility of switching between printing a mark, e.g. indicating completion of printing, based on a position from a reading area, i.e. operation in a first mode, and a position from a rear end of a document, i.e. operation in a second mode. By allowing the same image forming apparatus to allow printing of a mark in either of these two modes, the flexibility of the image forming apparatus of the present invention can be significantly enhanced.

Next, the function of the automatic manuscript document conveying apparatus according to the present invention is described in detail hereinafter.

Figures 4A, 4B, 4C:
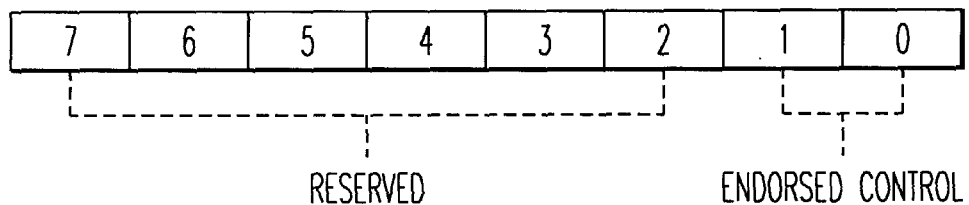
FIGS. 4A through 4C are explanatory diagrams explaining a mode selecting command of an embodiment of the present invention.

In the present invention, the changing-over operation from the first mode to the second mode and from the second mode to the first mode can be executed based on an input command from an external device, such as a personal computer. On this occasion, the signals shown in FIGS. 4A and FIG. 4B are input to the SCSI controller 40 from the personal computer. In the respective commands, the "Endorser Control" is read out. When the code "0" or "1" shown in FIG. 4B is "1H" as shown in FIG. 4C, the endorser unit 24 is driven based on a distance from a rear of the document, i.e. operation is in the second mode. On the other hand, when the code "0" or "1" shown in FIG. 4B is "2H" as shown in FIG. 4C, the endorser unit 24 is driven based on a distance from the reading area, i.e. operation is in the first mode.

The setting operation for the reading area of the document is practiced at the same time.

Here, in the state of setting the mode to the second mode to form the mark on the document based on a distance from the rear of the document, the endorser unit 24 prints the mark at a position of, e.g., 7 mm from the rear edge portion of the document by use of the endorser unit 24 after the document has passed the slit glass 3 and been read.

Figure 5:
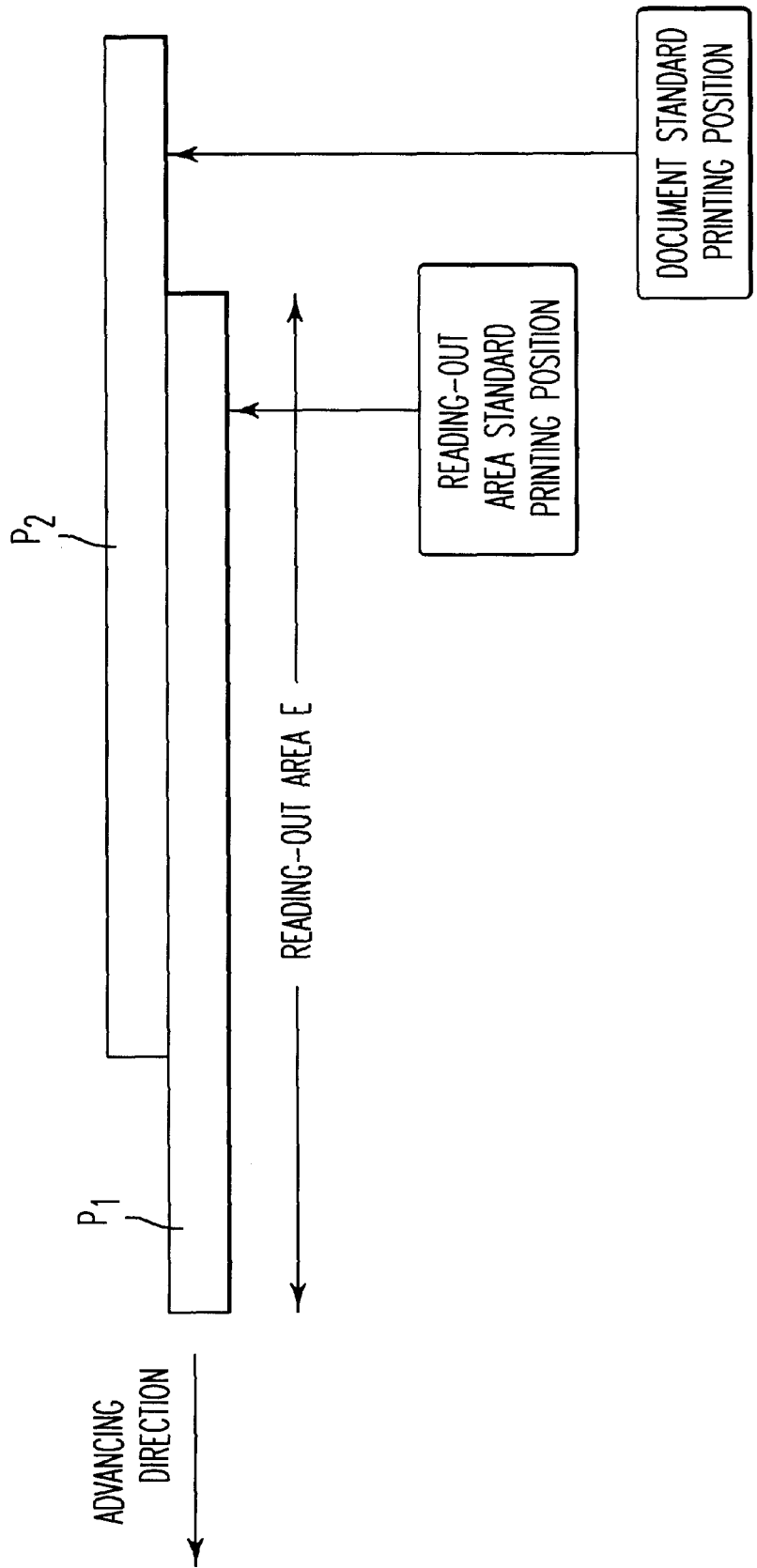
FIG. 5 is an explanatory diagram explaining a relationship between a document and a reading area at a time when double conveyance of documents occurs according to an embodiment of the present invention.

At this time, when an improper conveyance of two or more documents occurs, e.g. if documents are not properly separated by the paper feeding roller 14 and the reverse roller 15, the length of the document becomes longer than the reading area E as shown in FIG. 5. In FIG. 5, P1 represents the document which has been already read, while P2 represents the document which has been improperly doubly conveyed.

If the printing operation of the mark is executed using the rear end of the document as a reference in such a state of improper double feeding, the mark would be inevitably printed at a position 7 mm from the rear end portion of the doubly-conveyed manuscript document P2. Thus, the mark would be printed at an improper position.

In the present embodiment, when such a situation occurs, the length of the document is detected based on the detecting information from the registration sensor 46. If the length of the document is longer than the reading area E, the endorser unit 24 is driven such that the mark is immediately printed at a position 7 mm from the rear end portion of the reading area, i.e., the operation is switched to the first mode.

On the other hand, and as discussed above, when the mode is set to the first mode and the mark is printed on the document based on a distance from the reading area, the mark, e.g. representing the completion of the reading, is placed at a position of, e.g., 7 mm from the rear end portion of the reading area by use of the endorser unit 24 when the document passes the slit glass 3 and is read therein. Such a method of printing may also be referred to as an "End of Medium".

Figure 6:
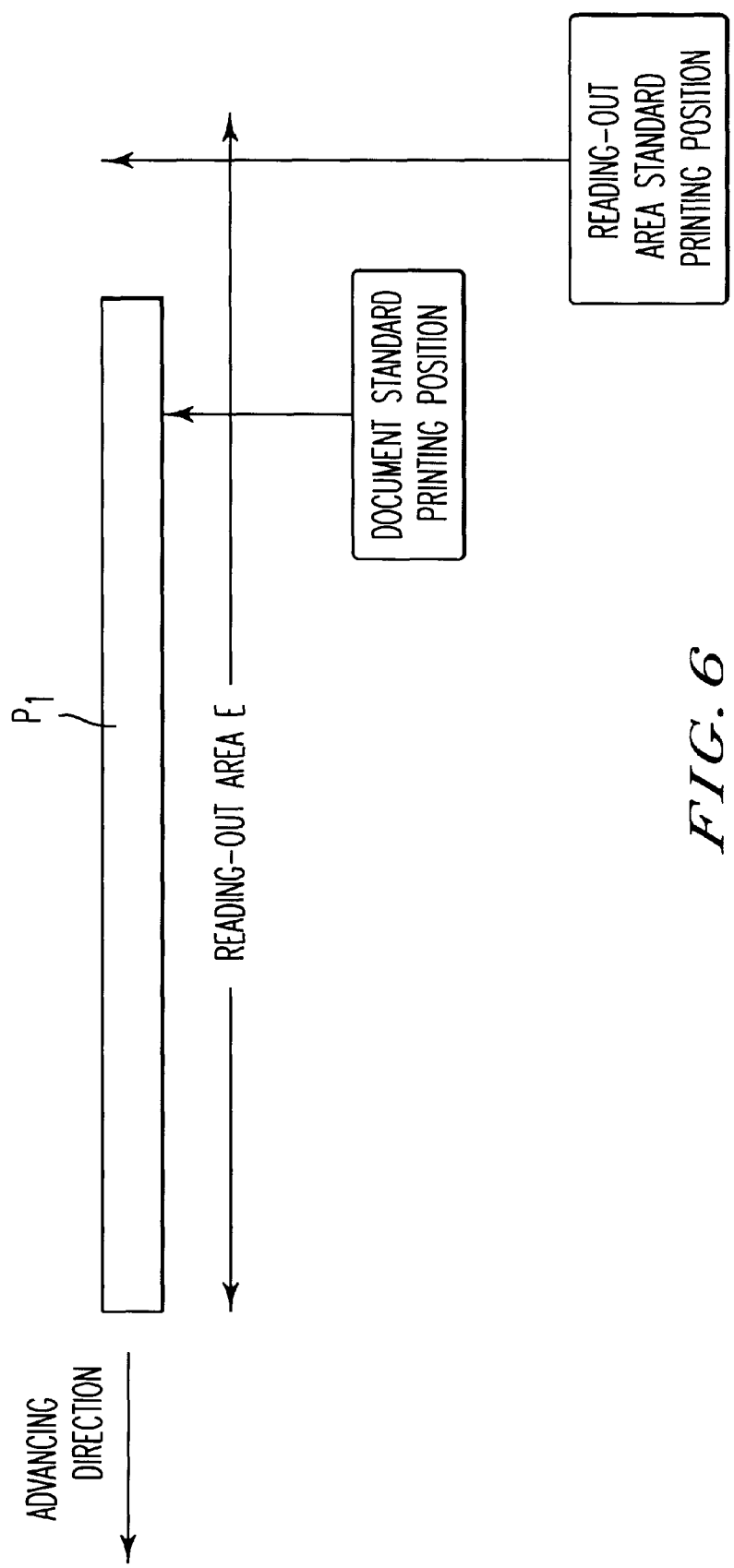
FIG. 6 is an explanatory diagram explaining a relationship between a document and a reading area at a time when a length of a document is short according to an embodiment of the present invention.

At this time, if the length of the document is shorter than the reading area E as shown in FIG. 6, the mark cannot be printed at the position 7 mm from the rear end portion of the reading area E, because then the mark would then either not be printed on the document or be printed at an improper area on the document.

In the present embodiment, when such a situation occurs, the length of the document is judged on the basis of the detecting information from the registration sensor 46. When the length of the document is shorter than the reading area E, the endorser unit 24 is immediately driven so as to print the mark at a position 7 mm from the rear end portion of the document, i.e., the operation is switched to the first mode.

In such ways according to the present embodiment, in the case of setting the second mode in which the printing position of the mark is based on a distance from a rear end of a document, when the length of the document which is read is equal to or longer than the reading area, the mode is automatically changed over to the first mode of executing the printing of the mark based a distance from the reading area. Thereby, even in a case that an improper conveyance of double or plural documents occurs, the printing operation can be executed properly on the reading document.

Furthermore, when the mode is set to the first mode of executing the printing of the mark based on a distance from a reading area, in a case that the length of the reading document is shorter than the reading area, the printing operation can also be properly executed for a short manuscript document, by automatically changing over the mode from the first mode to the second mode. In this situation, the mark is then printed on the document based on a position from a rear end of the document.

As the result, by performing the changing-over control from the first mode to the second mode and vice versa, the usability of the ADF 2 can be improved, and in addition, the printing operation can be surely executed for both of doubly conveyed documents or short documents.

Moreover, in the present embodiment, the CPU 48 is provided at the side of the scanner device 1, and can set the reading area, the mode, and the control of changing-over the modes. However, needless to mention, it may be allowable to provide the CPU 48 at the side of the ADF 2 and to perform similar changing-over controls.

Furthermore, in the present embodiment, since the setting of the first and second modes can be performed under the command of selecting the mode from an external device such as a personal computer by use of the SCSI controller 40, the ADF 2 can be operated from a remote place without adding a special apparatus or apparatuses.

Figure 7:
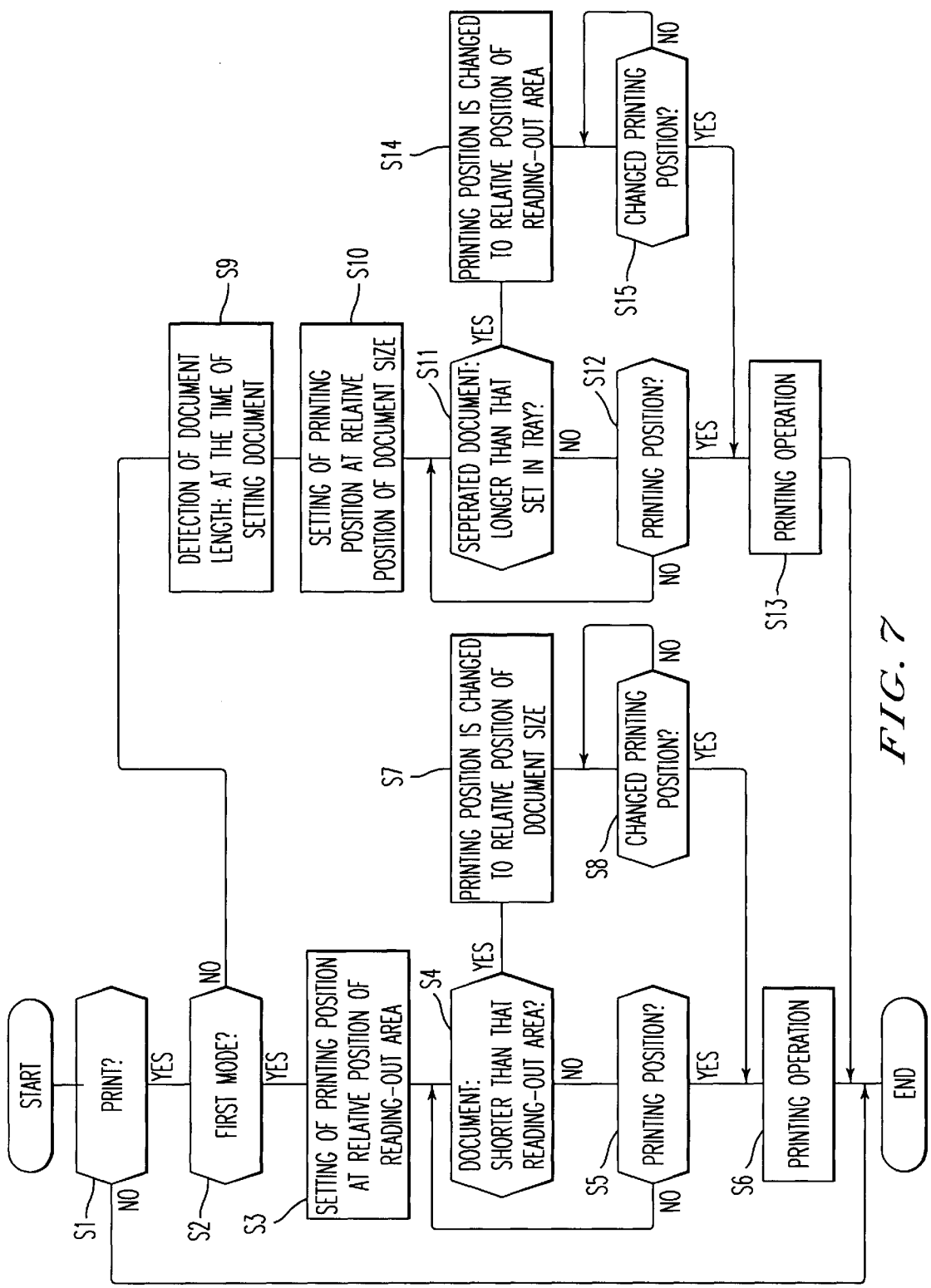
FIG. 7 is a flow-chart illustrating a printing operation of an embodiment according to the present invention.

Next, the operation of the apparatus is described hereinafter in more detail, referring to the flowchart of FIG. 7. The content of the flowchart shown in FIG. 7 is a control program stored in the ROM 49 and executed in the CPU 48.

In the present embodiment, the changing-over operation from the first mode to the second mode, and vice versa, can be executed on the basis of an input command from an external device such as a personal computer. At first, whether the printing operation is desired to be performed is judged (Step S1). If a printing operation is not to be performed, the process at this time is ended. On the other hand, if a printing operation is to be performed, whether the mode is set to the first mode is judged (Step S2).

On this occasion, the signals shown in FIGS. 4A and 4B are input to the SCSI controller 40 from the personal computer through an interface. Among the respective commands, "Endorser Control" is read out. When the codes "0" and "1" shown in FIG. 4B are "1H" as shown in FIG. 4C, the endorser unit 24 is driven in the second mode (i.e. based on a distance from a rear end of a document). When the codes "0" and "1" are "2H", the endorser unit 24 is driven in the first mode (based on a distance from a reading area).

In the state of setting the mode to the first mode at the Step S2, the mark, e.g. representing completion of reading of a document, is set to be printed at a position of, e.g., 7 mm from the rear end portion of the reading area of the document passing through the slit glass 3, e.g. after completing the reading operation, by use of the endorser unit 24 (Step S3).

At this time, if the length of the document is shorter than the reading area E, it is impossible to print the mark at a position of, e.g., 7 mm from the rear end portion of the read area of the document, as now discussed.

Whether the length of the document is shorter than the reading area is judged on the 25 basis of the detecting information from the register sensor 46 (Step S4). When the length of the document is not shorter than the reading area E, i.e. NO in Step S4, the mark is set to be printed at a position 7 mm from the rear end portion of the reading area E on the document when the document reaches the printing area, and thereafter, the endorser unit 24 is driven and the mark is printed at the noted position on the document (Steps S5 and S6).

On the other hand, when the length of the document is shorter than the reading area E at Step S4, i.e. YES in Step S4, the mode setting state is immediately changed from the first mode to the second mode of printing the mark at a position of, e.g., 7 mm from the rear end of the document (Step S7). Thereafter, whether the above changing operation is finished is judged (Step S8).

When the changing operation is finished at step S8, the endorser unit 24 is driven and the mark is printed at the position 7 mm from the rear end portion of the document (Step S6).

In the present embodiment, when the mode is set to the first mode, in a case that the length of the document which is read is equal to or shorter than the reading area, the mode is automatically changed over from the first mode to the second mode. Thereby, the printing operation can be surely executed on a short document.

On the other hand, when the mode is not set to the first mode at Step S2, namely when the mode is set to the second mode, the size of the document put in the document tray 12 is detected on the basis of the detecting information from the document setting sensor 51 (Step S9).

Next, the mark, e.g. indicating completion of reading of the document, is set to be printed at a position of, e.g., 7 mm from the rear end portion of the document passing through the slit glass 3 by use of the endorser unit 24 (step S10). At this time, in a case that document sheets are not normally separated by the paper feeding roller 24 and the reverse roller 15, and thereby double or plural sheets of documents are improperly conveyed, the length of the document turns out to be longer than the reading area E as shown in FIG. 5. In FIG. 5, the symbol P1 represents the read sheet document and the symbol P2 represents the double or plural sheet document. In such a state, if the printing operation is performed based on a distance from the rear end of the document, the printing is unpreferably executed at a position 7 mm from the rear end portion of the doubly-conveyed document P2.

In such a situation, and in order to avoid such an undesirable operation, by comparing the detecting information of the registration sensor 45 with that of the document setting sensor 51, whether the length of the separated document is longer than that of the document(s) put in the document tray 12 is judged (Step S11).

Here, in a case that the length of the separated document is not longer than that of the document(s) put in the document tray 12, i.e. NO in Step S11, the document is judged not to be doubly conveyed. Under such a judgment, the mark is set to be printed at the position 7 mm from the rear end portion of the document, i.e., operation is executed in the first mode. Thereafter, the endorser unit 24 is driven and the printing operation is performed at this position on the document (Steps S12 and S13).

However, when the length of the document separated at the step S11 is longer than that of the document(s) put in the document tray 12, i.e. YES in Step S11, the document is judged to be doubly conveyed. Under such a judgement, the mode setting is changed to the first mode from the second mode so as to print the mark at the position 7 mm from the rear end position of the reading area, i.e., operation is executed in the second mode (Step S14).

Next, whether the mode setting has been changed is judged (Step S15). In a case that the mode setting has been changed, i.e. YES in Step S15, the endorser unit 24 is driven to print the mark at the position 7 mm from the rear end portion of the reading area (Step S13).

With such an operation according to the present embodiment, in a case that the length of the reading document is equal to or longer than the reading area at the time of setting the mode to the second mode of printing the mark at a position based on distance from a rear end of the document, the mode is automatically changed over to the first mode of setting the printing position based on a distance from a reading area. Thereby, even if a double conveyance of plural sheets of documents occurs, the printing operation can be performed based on a distance from a reading area of a read document.

Furthermore, in the present embodiment, the CPU 48 selects either one of the first mode and the second mode. Therefore, the setting of the first mode or the second mode can be freely done and the usability of the ADF 2 can be improved. Moreover, the printing operation can be surely performed on both of doubly conveyed documents and a short document.

Moreover, in the present embodiment, the CPU 48 is provided at the side of the scanner device 1. The CPU 48 executes the setting of the reading area, the setting of the mode, and the control of changing-over the mode. However, needless to mention, it is also allowable to perform such changing-over control by use of the CPU 48 provided at the side of the ADF 2.

Furthermore, in the present embodiment, since the setting of the first and second modes can be performed under the command of selecting the mode from an external device such as a personal computer by use of the SCSI controller 40, the ADF 2 can be operated from a remote place without adding a special apparatus or apparatuses.

Furthermore, in the present embodiment, the changing-over operation from the first mode to the second mode, and vice versa, can be performed under an input command from an external device, e.g. a personal computer. However, it is also allowable to set the changing-over of the mode therebetween by a switch operation on the operation panel 35 of the apparatus main body. Or otherwise, another special switch such as a click switch can be used for changing-over the mode. Even in such a way, the changing-over operation between the first and second modes can be simply performed, and thereby the usability of the ADF 2 can be improved. On this occasion, the operation panel 35 of the apparatus main body constructs the operating part.

Furthermore, it is also allowable that the mode is set to the first mode or the second mode as the initial setting at the time of delivering the scanner device 1. For instance, at the time of setting the mode to the first mode as the initial setting, the judgment as shown by the step S4 is performed. Only when the length of the document is shorter than that of the reading area, the mode setting is changed from the first mode to the second mode. Or otherwise, when the mode is set to the second mode as the initial setting, the judgment as shown by the step S11 is performed, and thereby, the mode setting is changed to the first mode from the second mode only in a case that the length of the separated document is greater than the length of the document(s) put in the document tray 12.

On this occasion, it is needless to mention that, even though the setting is changed, after finishing the changing-over control of the respective modes, the mode is set once again to the initially set first mode or second mode.

As is apparent from the foregoing description, according to a first feature of the present invention, when the mode is set to the second mode in which the printing position is based on a distance from a rear end of a document, in a case that the length of the read document is not shorter than the reading area, the mode is automatically changed over to the first mode of setting the printing position based on a distance from a reading area, and thereby, it is possible to practically perform the printing operation for a read document even in a case that double conveyance of documents occurs.

Moreover, when the mode is set to the first mode based on a distance from a reading area, in a case that the length of the reading document is not longer than the reading area, the mode is automatically changed over to the second mode from the first mode, and thereby, the printing operation can be surely executed on a short manuscript.

As the result, by performing the changing-over control from the first mode to the second mode, and vice versa, the usability of the ADF 2 can be improved. Furthermore, the printing operation can be surely executed for both of the doubly conveyed document and a short document.

According to a second aspect of the present invention, when the mode is set to the first mode, in a case that the length of the read document becomes equal to or shorter than the reading area, the mode is automatically charged over to the second mode, and thereby, the printing operation can be surely performed on a short document.

According to a third aspect of the present invention, when the mode is set to the second mode, in a case that the length of the read document becomes equal to or longer than the reading area, the mode is automatically changed over to the first mode, and thereby even if conveyance of double or plural documents occurs, the printing operation can be properly performed for the read document.

According to a fourth aspect of the present invention, since the settings of the mode from the first mode to the second mode, and vice versa, can be freely performed, the usability of the automatic document conveying apparatus can be improved and printing operations can be surely performed for both of a doubly-conveyed document and a short document.

According to a fifth aspect of the present invention, the changing-over operation between the first and second modes can be performed by use of an external device, such as a personal computer, and thereby the usability of the automatic document conveying apparatus can be further improved.

According to a sixth aspect of the present invention, the changing-over operation between the first and second modes can be simply performed at the side of the image reading apparatus, and thereby the usability of the automatic document conveying apparatus can be also further improved.

This invention can be conveniently implemented using a general purpose automatic document conveying apparatus according to the teachings of the present specification, as will be apparent to those skilled in the art. Appropriate document conveying can be readily prepared by those skilled in the art based on the teachings of the present disclosure, as will be apparent to those skilled in the art. The present invention may also be implemented by the preparation of an automatic document conveying apparatus of the disclosed embodiments, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

This document is based on Japanese Patent Application No. JPAP10-120,371 and another Japanese Patent Application No. JPAP11-110,311, respectively filed on Apr. 30, 1998, and on Apr. 19, 1999, in the Japanese Patent Office, the entire contents of which are hereby incorporated by reference.

What is claimed is:

1. An automatic document conveying apparatus comprising:

a separation conveying medium configured to separate plural documents mounted on a document mounting stand sheet-by-sheet and to convey respective separated sheets to a reading position;

a character printing medium positioned downstream in a document conveying direction from said reading position and configured to print characters on said document after discharged from said reading position;

a setting medium configured to set a reading area of said document conveyed to said reading position;

a selection medium configured to select either one of a first mode of setting a position of printing characters on said document by said character printing medium based on a distance from the reading area, or a second mode of setting the position of printing the characters on said document based on a distance from a rear edge portion of said document;

a detection medium configured to detect a length of said document separated by the separation conveying medium; and a control medium configured to automatically change over the setting mode to said first mode from said second mode when said document has a length equal to or longer than a length of said reading area, and automatically changing over the setting mode to said second mode from the first mode when said document has a length equal to or less than the length of said reading area.

2. An image reading apparatus provided with an automatic document conveying apparatus, wherein said automatic document conveying apparatus comprises:

a separation conveying medium configured to separate plural documents mounted on a document mounting stand sheet-by-sheet and to convey respective separated sheets to a reading position;

a character printing medium positioned downstream in a document conveying direction from said reading position and configured to print characters on said document after discharged from said reading position;

a setting medium configured to set a reading area of said document conveyed to said reading position;

a selection medium configured to select either one of a first mode of setting a position of printing characters on said document of said character printing medium based on a distance from the reading area, or a second mode of setting the position of printing the characters on said document based on a distance from a rear edge portion of said document;

a detection medium configured to detect a length of said document separated by the separation conveying medium; and a control medium configured to automatically change over the setting mode to said first mode from said second mode when said document has a length equal to or longer than a length of said reading area, and automatically changing over the setting mode to said second mode from the first mode when said document has a length equal to or less than the length of said reading area.

3. An image reading apparatus provided with an automatic document conveying apparatus, wherein said automatic document conveying apparatus comprises:

a separation conveying medium configured to separate plural documents mounted on a document mounting stand sheet-by-sheet and to convey respective separated sheets to a reading position;

a character printing medium positioned downstream in a document conveying direction from said reading position and configured to print characters on said document after discharged from said reading position;

a setting medium configured to set said reading area of said document conveyed to said reading position;

a control medium configured to set a first mode of setting a position of printing the characters with said character printing medium based on a distance from the reading area, and a second mode of setting the position of printing the characters on said document based on a distance from a rear edge portion of the document; and a detection medium configured to detect a length of said document; and wherein, in a case that the length of said document is detected to be not longer than said reading area based on detection information from said detection medium, and when the mode is set to said first mode, said control medium changes over the mode from the first mode to the second mode.

4. An image reading apparatus provided with an automatic document conveying apparatus as defined in claim 3, wherein said automatic document conveying apparatus further comprises a selection medium configured to select either one of said first mode or said second mode; and wherein said control medium sets the mode to either one of said first mode and said second mode based on selection information from said selection medium.

5. An image reading apparatus provided with an automatic document conveying apparatus as defined in claim 4, wherein said automatic document conveying apparatus further comprises an interface which can be connected to a computer; and wherein said control medium performs the changing-over operation from the first mode to the second mode, and from the second mode to the first mode, based on a command input from said computer through said interface.

6. An image reading apparatus provided with an automatic document conveying apparatus as defined in claim 4, wherein said automatic document conveying apparatus further comprises an operating part configured to set the changing-over operation from the first mode to the second mode and from the second mode to the first mode; and wherein said selection medium performs the changing-over operation from the first mode to the second mode, and from the second mode to the first mode, based on an input signal from said operating part.

7. An image reading apparatus provided with an automatic document conveying apparatus, wherein said automatic document conveying apparatus comprises:

a separation conveying medium configured to separate plural documents mounted on a document mounting stand sheet-by-sheet and to convey respective separated sheets to a reading position;

a character printing medium positioned downstream in a document conveying direction from said reading position and configured to print characters on said document after discharged from said reading position;

a setting medium configured to set a reading area of said document conveyed to said reading position;

a control medium configured to set a first mode of setting a position of printing the characters on said document with said character printing medium based on a distance from the reading area, and a second mode of setting the position of printing the characters on said document based on a distance from a rear edge portion of the document; and a detection medium configured to detect a length of said document; and wherein, in a case that the length of said document is detected to be not shorter than said reading area based on detection information from said detection medium, and when the mode is set to said second mode, said control medium changes over the mode from the second mode to the first mode.

8. An image reading apparatus provided with an automatic document conveying apparatus as defined in claim 7, wherein said automatic document conveying apparatus further comprises a selection medium configured to select either one of said first mode or said second mode; and wherein said control medium sets the mode to either one of said first mode and said second mode based on selection information of said selection medium.

9. An image reading apparatus provided with an automatic document conveying apparatus as defined in claim 8, wherein said automatic document conveying apparatus further comprises an interface which can be connected to a computer; and wherein said control medium performs the changing-over operation from the first mode to the second mode, and from the second mode to the first mode, based on a command input from said computer through said interface.

10. An image reading apparatus provided with an automatic document conveying apparatus as defined in claim 8, wherein said automatic document conveying apparatus further comprises an operating part configured to set the changing-over operation from the first mode to the second mode and from the second mode to the first mode; and wherein said selection medium performs the changing-over operation from the first mode to the second mode, and from the second mode to the first mode, based on an input signal from said operating part.

11. An automatic document conveying apparatus comprising:

separation conveying means for separating plural documents mounted on a document mounting stand sheet-by-sheet and for conveying respective separated sheets to a reading position;

character printing means positioned downstream in a document conveying direction from said reading position and for printing characters on said document after discharged from said reading position;

setting means for setting a reading area of said document conveyed to said reading position;

selection means for selecting either one of a first mode of setting a position of printing characters on said document by said character printing means based a distance from the reading area, or a second mode of setting the position of printing the characters on said document based on a distance from a rear edge portion of said document;

detection means for detecting a length of said document separated by the separation conveying means; and control means for automatically changing over the setting mode to said first mode from said second mode when said document has a length equal to or longer than a length of said reading area, and for automatically changing over the setting mode to said second mode from the first mode when said document has a length equal to or less than the length of said reading area.

12. An image reading apparatus provided with an automatic document conveying apparatus, wherein said automatic document conveying apparatus comprises:

separation conveying means for separating plural documents mounted on a document mounting stand sheet-by-sheet and for conveying respective separated sheets to a reading position;

character printing means positioned downstream in a document conveying direction from said reading position and for printing characters on said document after discharged from said reading position;

setting means for setting a reading area of said document conveyed to said reading position;

selection means for selecting either one of a first mode of setting a position of printing characters on said document of said character printing means based a distance from the reading area, or a second mode of setting the position of printing the characters on said document based on a distance from a rear edge portion of said document;

detection means for detecting a length of said document separated by the separation conveying means; and control means for automatically changing over the setting mode to said first mode from said second mode when said document has a length equal to or longer than a length of said reading area, and for automatically changing over the setting mode to said second mode from the first mode when said document has a length equal to or less than the length of said reading area.

13. An image reading apparatus provided with an automatic document conveying apparatus, wherein said automatic document conveying apparatus comprises:

separation conveying means for separating plural documents mounted on a document mounting stand sheet-by-sheet and for conveying respective separated sheets to a reading position;

character printing means positioned downstream in a document conveying direction from said reading position and for printing characters on said document after discharged from said reading position;

setting means for setting said reading area of said document conveyed to said reading position;

control means for setting a first mode of setting a position of printing the characters with said character printing means based on a distance from the reading area, and a second mode of setting the position of printing the characters on said document based on a distance from a rear edge portion of the document; and detection means for detecting a length of said document; and wherein, in a case that the length of said document is detected to be not longer than said reading area based on detection information from said detection means, and when the mode is set to said first mode, said control means changes over the mode from the first mode to the second mode.

14. An image reading apparatus provided with an automatic document conveying apparatus as defined in claim 13, wherein said automatic document conveying apparatus further comprises selection means for selecting either one of said first mode or said second mode; and wherein said control means sets the mode to either one of said first mode or said second mode based on selection information from said selection means.

15. An image reading apparatus provided with an automatic document conveying apparatus as defined in claim 14, wherein said automatic document conveying apparatus further comprises interface means for connecting to a computer; and wherein said control means performs the changing-over operation from the first mode to the second mode, and from the second mode to the first mode, based on a command input from said computer through said interface means.

16. An image reading apparatus provided with an automatic document conveying apparatus as defined in claim 14, wherein said automatic document conveying apparatus further comprises operating means for setting the changing-over operation from the first mode to the second mode and from the second mode to the first mode; and wherein said selection means performs the changing-over operation from the first mode to the second mode, and from the second mode to the first mode, based on an input signal from said operating means.

17. An image reading apparatus provided with an automatic document conveying apparatus, wherein said automatic document conveying apparatus comprises:

separation conveying means for separating plural documents mounted on a document mounting stand sheet-by-sheet and for conveying respective separated sheets to a reading position;

character printing means positioned downstream in a document conveying direction from said reading position and for printing characters on said document after discharged from said reading position;

setting means for setting a reading area of said document conveyed to said reading position;

control means for setting a first mode of setting a position of printing the characters on said document with said character printing means based on a distance from the reading area, and a second mode of setting the position of printing the characters on said document based on a distance from a rear edge portion of the document; and detection means for detecting a length of said document; and wherein, in a case that the length of said document is detected to be not shorter than said reading area based on detection information from said detection means, and when the mode is set to said second mode, said control means changes over the mode from the second mode to the first mode.

18. An image reading apparatus provided with an automatic document conveying apparatus as defined in claim 17, wherein said automatic document conveying apparatus further comprises selection means for selecting either one of said first mode or said second mode; and wherein said control means sets the mode to either one of said first mode and said second mode based on selection information from said selection means.

19. An image reading apparatus provided with an automatic document conveying apparatus as defined in claim 18, wherein said automatic document conveying apparatus further comprises interface means for connecting to a computer; and wherein said control means performs the changing-over operation from the first mode to the second mode, and from the second mode to the first mode, based on a command input from said computer through said interface means.

20. An image reading apparatus provided with an automatic document conveying apparatus as defined in claim 18, wherein said automatic document conveying apparatus further comprises operating means for setting the changing-over operation from the first mode to the second mode and from the second mode to the first mode; and wherein said selection means performs the changing-over operation from the first mode to the second mode, and from the second mode to the first mode, based on an input signal from said operating means.

21. A method of automatically conveying a document comprising the steps of:

separating plural documents mounted on a document mounting stand sheet-by-sheet and conveying respective separated sheets to a reading position;

printing, by a character printing medium positioned downstream in a document conveying direction from said reading position, characters on said document after discharged from said reading position;

setting a reading area of said document conveyed to said reading position;

selecting either one of a first mode of setting a position of printing characters on said document by said character printing medium based a distance from the reading area, or a second mode of setting the position of printing the characters on said document based on a distance from a rear edge portion of said document;

detecting a length of said document separated in the step of separating; and automatically changing over the setting mode to said first mode from said second mode when said document has a length equal to or longer than a length of said reading area, and automatically changing over the setting mode to said second mode from the first mode when said document has a length equal to or less than the length of said reading area.

22. A method of automatically conveying a document comprising the steps of:

separating plural documents mounted on a document mounting stand sheet-by-sheet and conveying respective separated sheets to a reading position;

printing, by a character printing medium positioned downstream in a document conveying direction from said reading position, characters on said document after discharged from said reading position;

first setting said reading area of said document conveyed to said reading position;

second setting a first mode of setting a position of printing the characters with said character printing medium based on a distance from the reading area, and a second mode of setting the position of printing the characters on said document based on a distance from a rear edge portion of the document; and detecting a length of said document; and wherein, in a case that the length of said document is detected to be not longer than said reading area based on detection information from said detecting step, and when the mode is set to said first mode, the mode is changed over from the first mode to the second mode in the second setting step.

23. A method of automatically conveying a document as defined in claim 22, further comprising the step of selecting either one of said first mode and said second mode; and wherein in said second setting step the mode is set to either one of said first mode or said second mode based on selection information from said selection step.

24. A method of automatically conveying a document as defined in claim 23, further comprising the step of interfacing with a computer; and wherein said second setting step performs the setting from the first mode to the second mode, and from the second mode to the first mode, based on a command input from said computer.

25. A method of automatically conveying a document as defined in claim 23, further comprising the step of changing-over an operation from the first mode to the second mode and from the second mode to the first mode; and wherein said second setting step performs the setting from the first mode to the second mode, and from the second mode to the first mode, based on an input signal from an operating part.

26. A method of automatically conveying a document comprising the steps of:

separating plural documents mounted on a document mounting stand sheet-by-sheet and conveying respective separated sheets to a reading position;

printing, by a character printing medium positioned downstream of a document conveying direction from said reading position characters on said document after discharged from said reading position;

first setting a reading area of said document conveyed to said reading position;

second setting a first mode of setting a position of printing the characters on said document with said character printing medium based on a distance from the reading area, and a second mode of setting the position of printing the characters on said document based on a distance from a rear edge portion of the document; and detecting a length of said document; and wherein, in a case that the length of said document is detected to be not shorter than said reading area based on detection information from said detection step, and when the mode is set to said second mode, the mode is changed over from the second mode to the first mode in the second setting step.

27. A method of automatically conveying a document as defined in claim 26, further comprising the step of selecting either one of said first mode and said second mode; and wherein in said second setting step the mode is set to either one of said first mode or said second mode based on selection information from said selection step.

28. A method of automatically conveying a document as defined in claim 27, further comprising the step of interfacing with a computer; and wherein said second control step performs the setting from the first mode to the second mode, and from the second mode to the first mode, based on a command input from said computer.

29. A method of automatically conveying a document as defined in claim 27, further comprising the step of changing-over an operation from the first mode to the second mode and from the second mode to the first mode; and wherein said second setting step performs the setting from the first mode to the second mode, and from the second mode to the first mode, based on an input signal from an operating part.

\* \* \* \* \*